US011953410B2

(12) United States Patent
Konyuba et al.

(10) Patent No.: US 11,953,410 B2
(45) Date of Patent: Apr. 9, 2024

(54) SPECIMEN SUPPORT TOOL, SUPPORT APPARATUS AND SPECIMEN PREPARATION METHOD

(71) Applicant: JEOL Ltd., Tokyo (JP)

(72) Inventors: Yuji Konyuba, Tokyo (JP); Tomohiro Haruta, Tokyo (JP); Tomohisa Fukuda, Tokyo (JP); Yuta Ikeda, Tokyo (JP); Yusuke Toriumi, Tokyo (JP)

(73) Assignee: JEOL Ltd., Tokyo (JP)

( * ) Notice: Subject to any disclaimer, the term of this patent is extended or adjusted under 35 U.S.C. 154(b) by 206 days.

(21) Appl. No.: 17/378,914

(22) Filed: Jul. 19, 2021

(65) Prior Publication Data

US 2022/0018742 A1 Jan. 20, 2022

(30) Foreign Application Priority Data

Jul. 20, 2020 (JP) .................................. 2020-123627

(51) Int. Cl.
*G01N 1/00* (2006.01)
*G01N 1/06* (2006.01)
*G01N 1/28* (2006.01)

(52) U.S. Cl.
CPC ............. *G01N 1/2813* (2013.01); *G01N 1/06* (2013.01)

(58) Field of Classification Search
None
See application file for complete search history.

(56) References Cited

U.S. PATENT DOCUMENTS

| 2006/0008790 A1* | 1/2006 | Hayworth | ................ | G01N 1/06 435/40.5 |
| 2009/0117611 A1 | 5/2009 | Becker et al. | | |
| 2010/0167338 A1* | 7/2010 | Amano | ..................... | G01N 1/36 435/40.52 |

FOREIGN PATENT DOCUMENTS

| EP | 3889572 A1 | 6/2021 |
| GB | 2265981 A | 9/1992 |
| JP | H055682 A | 1/1993 |
| WO | 2020161895 A1 | 8/2020 |

OTHER PUBLICATIONS

Office Action issued in JP2020123627 dated May 10, 2022.
Extended European Search Report issued in EP21186411.1 dated Jan. 10, 2022.

* cited by examiner

*Primary Examiner* — Jyoti Nagpaul
(74) *Attorney, Agent, or Firm* — The Webb Law Firm (57) ABSTRACT

A specimen support tool for supporting a slice prepared by using a microtome includes a specimen support member on which a groove for guiding the slice is formed.

6 Claims, 10 Drawing Sheets

SPECIMEN SUPPORT TOOL, SUPPORT APPARATUS AND SPECIMEN PREPARATION METHOD

CROSS-REFERENCE TO RELATED APPLICATION

This application claims priority to Japanese Patent Application No. 2020-123627 filed Jul. 20, 2020, the disclosure of which is hereby incorporated by reference in its entirety.

BACKGROUND OF THE INVENTION

Field of the Invention

The present invention relates to a specimen support tool, a support apparatus and a specimen preparation method.

Description of Related Art

A slice prepared by using an ultramicrotome is spread on a water surface of distilled water filling a knife boat. The slice spread on the water surface is placed on a specimen support tool, such as a silicon substrate or a slide glass, and is observed by an optical microscope, fluorescence microscope, electron microscope, or the like.

For example, JP-A-05-005682 discloses that a slice sectioned by using a knife is floated in water contained in a pool boat, and this slice is placed on a grid and used as a specimen for a transmission electron microscope.

In a case of placing a slice on a specimen support tool, such as a grid, the slice floating on the water surface is scooped up by the specimen support tool so that the slice can be placed on the specimen support tool. With this method, however, it is difficult to place the slice on a desired position on the specimen support tool.

SUMMARY OF THE INVENTION

According to a first aspect of the invention, there is provided a specimen support tool for supporting a slice prepared by using a microtome, the specimen support tool including a specimen support member on which a groove for guiding the slice is formed.

According to a second aspect of the invention, there is provided a support apparatus for supporting a slice prepared by using a microtome, the support apparatus including:
- a specimen support tool including a specimen support member on which a groove for guiding the slice is formed; and
- a jig for securing the specimen support tool to a container for a liquid for floating the slice.

According to a third aspect of the invention, there is provided a specimen preparation method using a microtome, the method including:
- preparing a specimen support tool including a specimen support member on which a groove is formed;
- filling the groove with a liquid; and
- preparing a slice by using the microtome, the slice being guided by the groove.

DESCRIPTION OF THE INVENTION

According to an embodiment of the invention, there is provided a specimen support tool for supporting a slice prepared by using a microtome, the specimen support tool including a specimen support member on which a groove for guiding the slice is formed.

The above specimen support tool enables to place a slice prepared by using a microtome at a desired position.

According to an embodiment of the invention, there is provided a support apparatus for supporting a slice prepared by using a microtome, the support apparatus including:
- a specimen support tool including a specimen support member on which a groove for guiding the slice is formed; and
- a jig for securing the specimen support tool to a container for a liquid for floating the slice.

The above support apparatus enables to place a slice prepared by using a microtome at a desired position.

According to an embodiment of the invention, there is provided a specimen preparation method using a microtome, the method including:
- preparing a specimen support tool including a specimen support member on which a groove is formed;
- filling the groove with a liquid; and preparing a slice by using the microtome,
the slice being guided by the groove.

The above specimen preparation method enables to place a slice prepared by using a microtome at a desired position.

Preferred embodiments of the invention are described in detail below with reference to the drawings. It is noted that the following embodiments do not unduly limit the scope of the invention as stated in the claims. In addition, all of the components described in the following embodiments are not necessarily essential requirements of the invention.

1. First Embodiment

1.1. Specimen Support Tool

Figure 1:
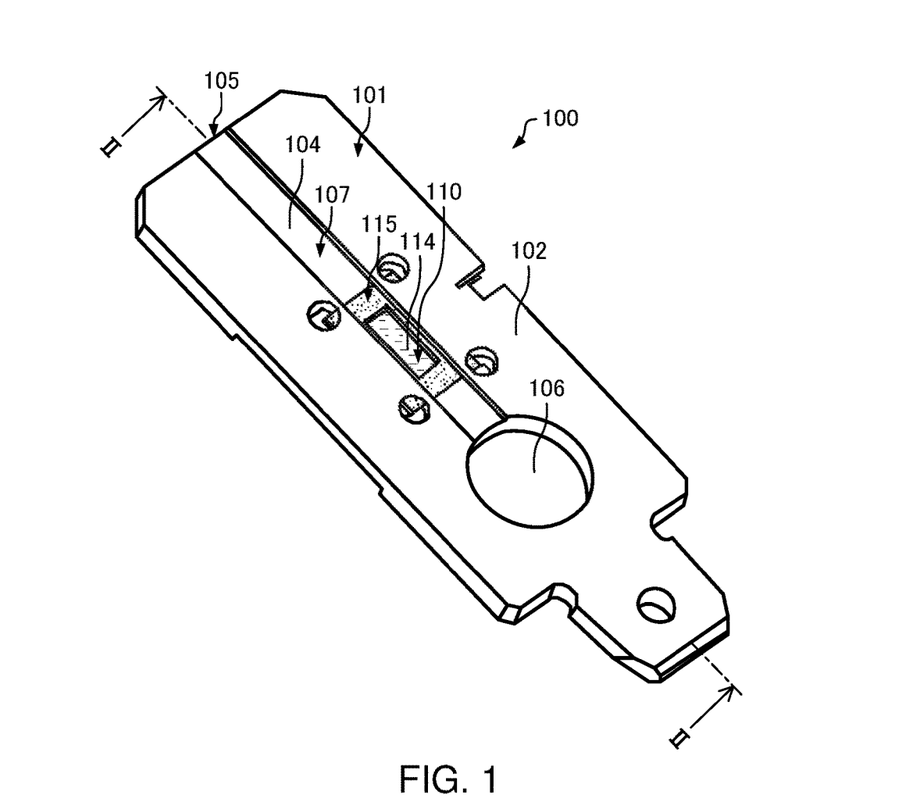
FIG. 1 is a schematic perspective view of a specimen support tool according to the first embodiment.
Figure 2:
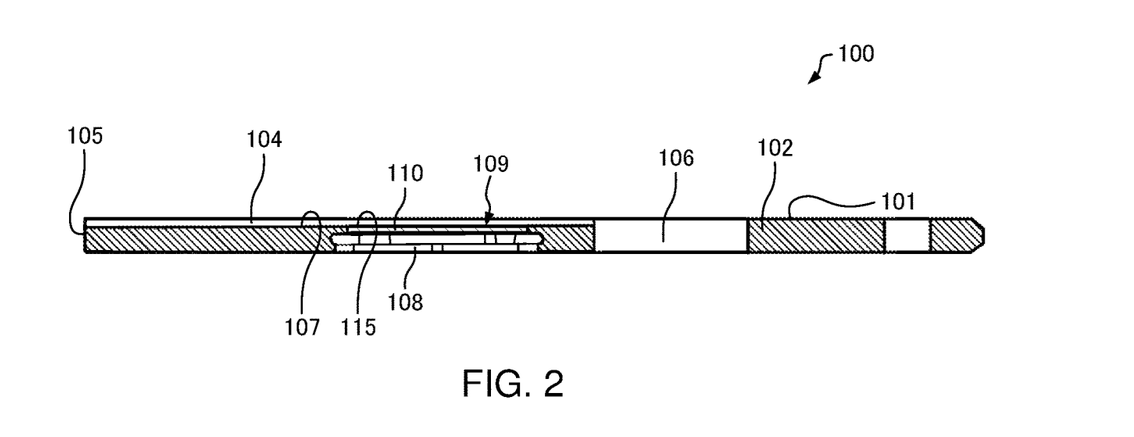
FIG. 2 is a schematic cross-sectional view of a specimen support tool according to the first embodiment.

First a specimen support tool according to the first embodiment will be described with reference to the drawings. FIG. 1 is a schematic perspective view of a specimen support tool 100 according to the first embodiment. FIG. 2 is a schematic cross-sectional view of the specimen support tool 100 according to the first embodiment. FIG. 2 is a cross-sectional view taken along the II-II line in FIG. 1.

The specimen support tool 100 is used for supporting a slice prepared by using a microtome. The specimen support tool 100 includes a specimen support member 102, as illustrated in FIG. 1. The specimen support tool 100 also includes a chip 110.

The specimen support member 102 supports a slice prepared by using a microtome. The specimen support member 102 is a specimen cartridge for a transmission electron microscope, for example. The specimen support member 102 may be a specimen holder for a transmission electron microscope. The specimen support member 102 is a plate member. The specimen support member 102 is a metal plate, for example. The specimen support tool 100 is loaded into the transmission electron microscope in a state of supporting an observation target slice.

A groove 104 is formed on the specimen support member 102. The groove 104 is formed on an upper surface 101 of the specimen support member 102. The groove 104 linearly extends from an edge 105 of the specimen support member 102 to a first through hole 106. The edge 105 of the specimen support member 102 is a surface constituting an outer edge of the specimen support member 102, for example. The groove 104 functions as a guide groove for guiding a slice prepared by using a microtome. In the specimen support tool 100, a slice can be guided to a desired position by the groove 104. The groove 104 guides the slice onto the chip 110. The depth of the groove 104 is about 0.2 mm, for example. The width of the groove 104 is about the same as the width of the support film 114 of the chip 110, and is about 1.5 mm, for example.

A recessed portion 109 is formed on a surface 107 that defines the bottom of the groove 104 of the specimen support member 102. The chip 110 can be installed in the recessed portion 109. When the chip 110 is installed in the recessed portion 109, an upper surface 115 of the chip 110 and the surface 107 of the specimen support member 102 line up on the same plane.

In the specimen support member 102, a slice prepared by using a microtome is placed on the chip 110. In other words, the specimen support member 102 supports the slice via the chip 110. However, the specimen support member 102 may directly support the slice.

In the example illustrated in FIG. 1 and FIG. 2, one chip 110 is installable on one specimen support tool 100, but a plurality of chips 110 may be installable on one specimen support tool 100.

In the specimen support member 102, the first through hole 106 and a second through hole 108 are formed. The first through hole 106 communicates with the groove 104. The second through hole 108 is formed in a region overlapping with the support film 114 of the chip 110. The second through hole 108 is formed on the surface that defines the bottom of the recessed portion 109.

Figure 3:
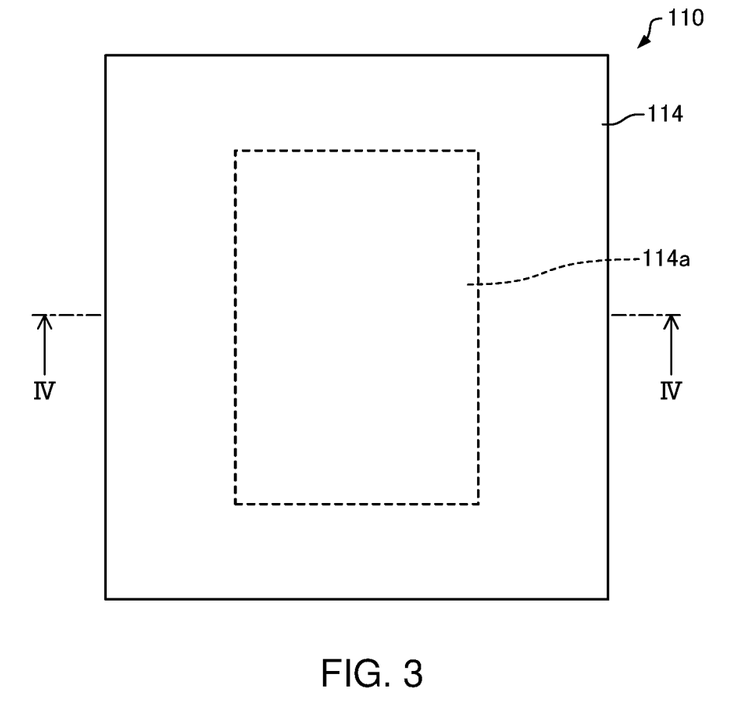
FIG. 3 is a schematic plan view of a chip.
Figure 4:
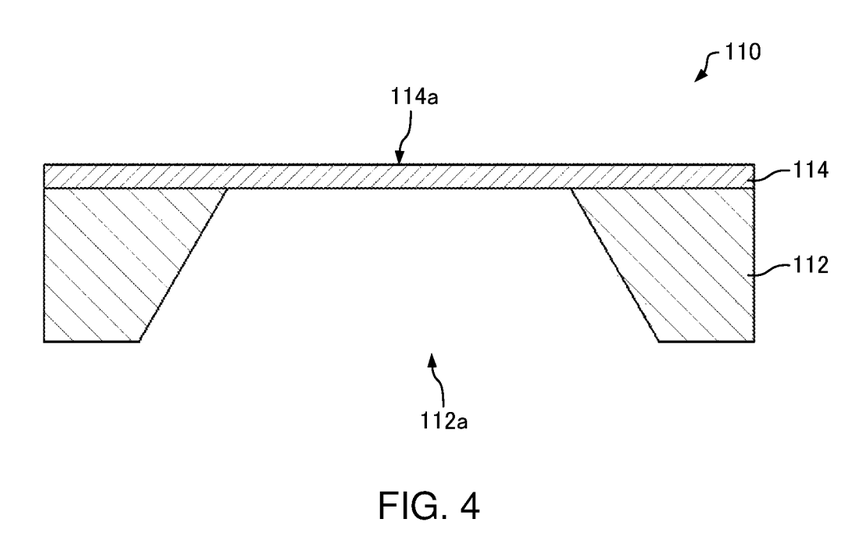
FIG. 4 is a schematic cross-sectional view of a chip.

FIG. 3 is a schematic plan view of the chip 110. FIG. 4 is a schematic cross-sectional view of the chip 110. FIG. 4 is a cross-sectional view taken along the IV-IV line in FIG. 3.

The chip 110 includes a substrate 112 and the support film 114.

The substrate 112 is a silicon substrate, for example. For the substrate 112, various substrates, such as a ceramic substrate, a glass substrate, a sapphire substrate and a synthetic resin substrate may be used. The thickness of the substrate 112 is from 100 μm to 200 μm, for example. A through hole 112a is formed in the substrate 112. A planar shape of the substrate 112 (shape of the substrate 112 viewed in the thickness direction) is a rectangle, for example.

The support film 114 is a film to support a slice. The support film 114 is held by the substrate 112. The support film 114 is a silicon nitride (SiN) film, for example. For the support film 114, a carbon film may be used. The film thickness of the support film 114 is severs tens nm, for example.

The support film 114 includes a thin film region 114a. The thin film region 114a is a region that does not overlap with the substrate 112 when viewed in the thickness direction of the substrate 112 (when viewed in the entering direction of the electron beam), that is, a region overlapping with the through hole 112a. By placing a slice on the thin film region 114a, the slice can be observed by the transmission electron microscope.

The planar shape of the thin film region 114a is a rectangle in the illustrated example. The length of one side of the thin film region 114a is from about several hundred μm to several mm. The planar shape of the thin film region 114a is not especially limited.

1.2. Support Apparatus

Figure 5:
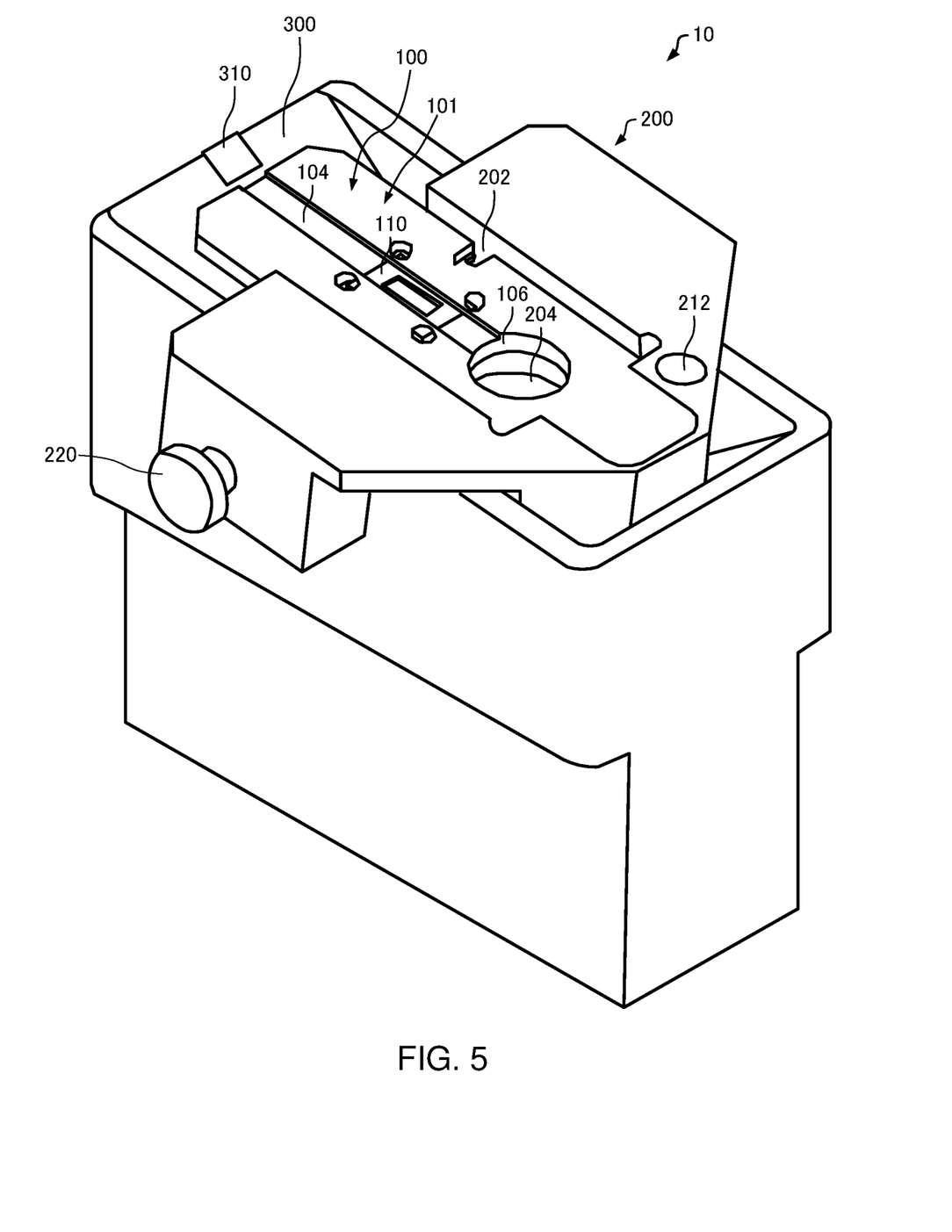
FIG. 5 is a schematic perspective view of a support apparatus.
Figure 6:
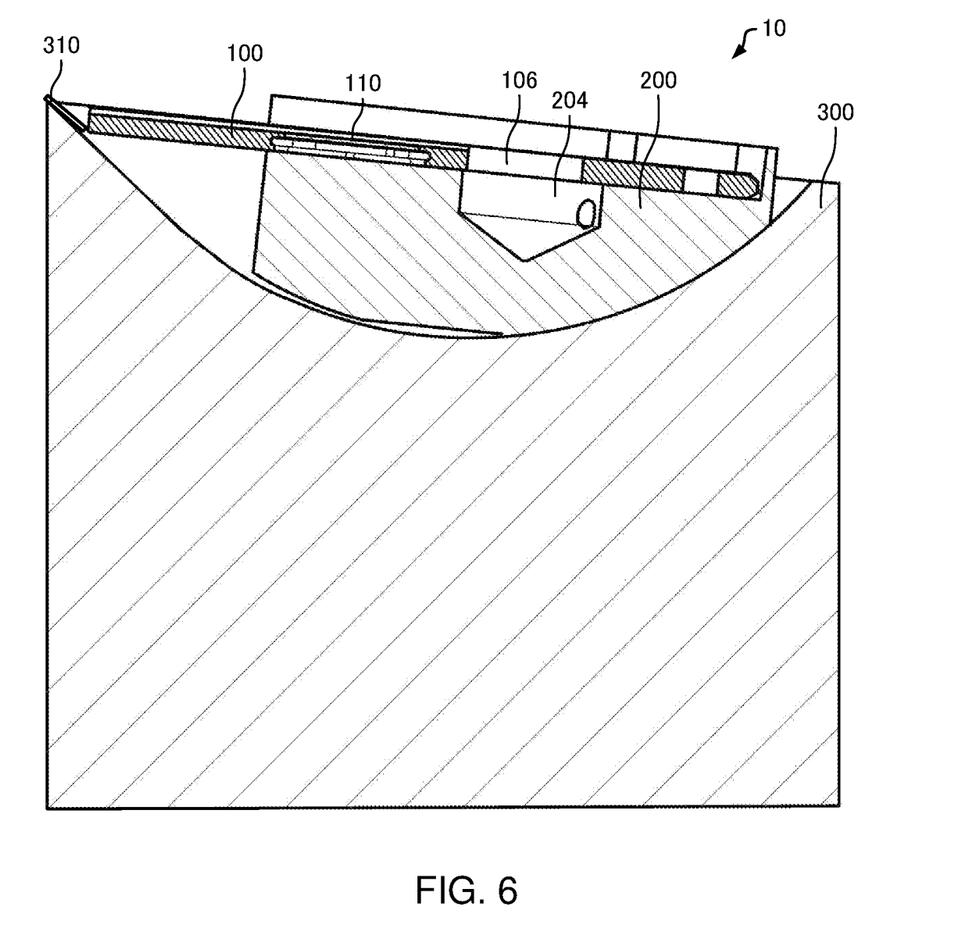
FIG. 6 is a schematic cross-sectional view of a support apparatus.
Figure 7:
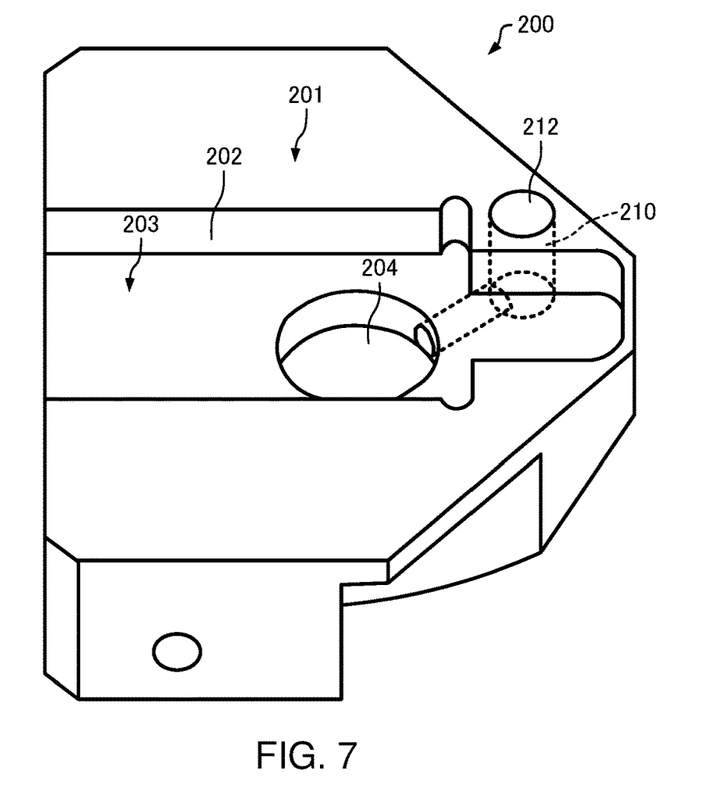
FIG. 7 is a schematic perspective view of a jig.

FIG. 5 is a schematic perspective view of a support apparatus 10. FIG. 6 is a schematic cross-sectional view of the support apparatus 10. FIG. 7 is a schematic perspective view of a jig 200.

The support apparatus 10 includes the specimen support tool 100 and the jig 200. The support apparatus 10 also includes a knife boat 300 (an example of a container).

As illustrated in FIG. 5 and FIG. 6, the specimen support tool 100 is installed in the knife boat 300 by the jig 200.

The jig 200 secures the specimen support tool 100 to the knife boat 300. The knife boat 300 is filled with distilled water. The jig 200 secures the specimen support tool 100 to the knife boat 300 in such a manner that the groove 104 of the specimen support tool 100 is filled with the distilled water. The specimen support tool 100 is disposed near a knife 310 in such a manner that the sectioned slice is spread along the groove 104.

The jig 200 secures the specimen support tool 100 in the horizontal position. The jig 200 secures the specimen support tool 100 to the knife boat 300 in such a manner that the water surface level is lower than the upper surface 101 of the specimen support tool 100, and is higher than the surface 107 that defines the groove 104. The liquid that fills the knife boat 300 is not limited to distilled water.

As illustrated in FIG. 7, the jig 200 has a first recessed portion 202 in which the specimen support tool 100 is installed. The first recessed portion 202 has a shape similar to the outer edge of the specimen support tool 100. When the specimen support tool 100 is installed in the first recessed portion 202, the specimen support tool 100 is secured to the jig 200.

A second recessed portion 204 is formed on a surface 203 that defines the bottom surface of the first recessed portion 202 of the jig 200. The surface 203 of the jig 200 is a surface on which the specimen support tool 100 is placed. In the state where the specimen support tool 100 is placed on the surface 203, the second recessed portion 204 communicates with the first through hole 106 of the specimen support tool 100. As illustrated in FIG. 6, the second recessed portion 204 and the first through hole 106 overlap in the state where the specimen support tool 100 is installed in the jig 200.

A flow passage 210 for draining the distilled water collected in the second recessed portion 204 is formed in the jig 200. The drain port 212 is formed on an upper surface 201 of the jig 200. The drain port 212 is connected to a pump for discharging the distilled water. The flow passage 210 connects the second recessed portion 204 and the drain port 212.

The jig 200 is installed in the knife boat 300 so as to extend across the knife boat 300. The jig 200 is secured to the knife boat 300 by a screw 220.

The knife boat 300 is a container for a liquid for floating a slice. In the knife boat 300, the knife 310 to section a bulk specimen is secured. The knife 310 is a diamond knife or a glass knife, for example.

1.3. Specimen Preparation Method

Figure 8:
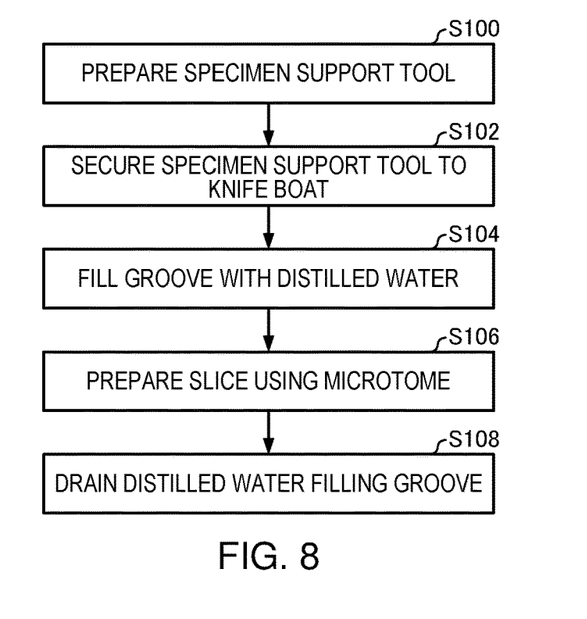
FIG. 8 is a flow chart illustrating an example of a specimen preparation method using a specimen support tool according to the first embodiment.
Figure 13:
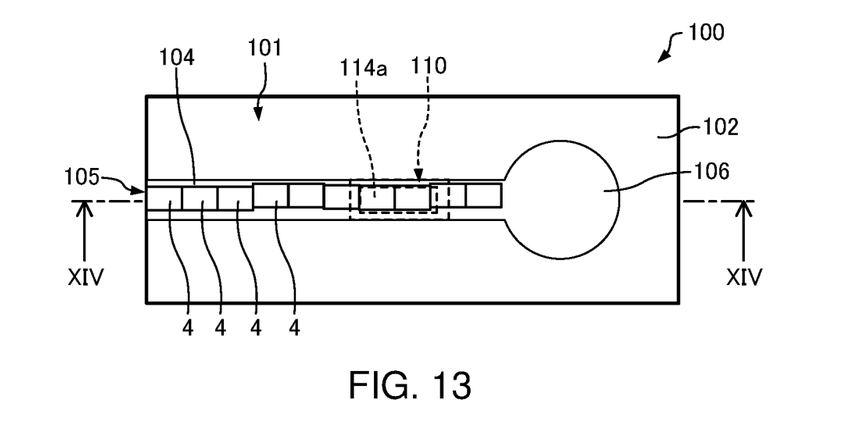
FIG. 13 is a schematic diagram illustrating a specimen preparation step using a specimen support tool according to the first embodiment.
Figure 14:
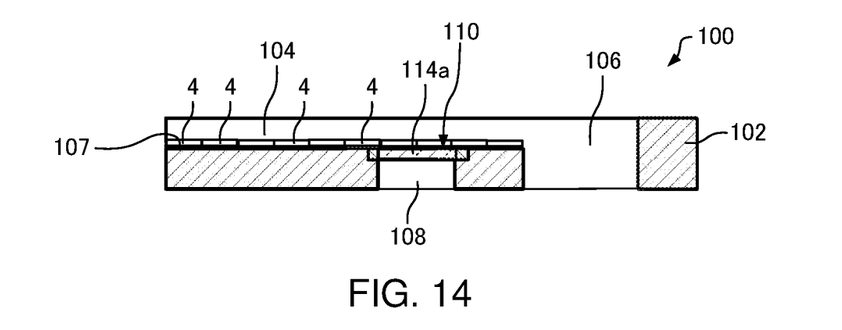
FIG. 14 is a schematic diagram illustrating a specimen preparation step using a specimen support tool according to the first embodiment.

FIG. 8 is a flow chart illustrating an example of a specimen preparation method using the specimen support tool 100. FIG. 9 to FIG. 14 are schematic diagrams of the specimen preparation steps using the specimen support tool 100. FIG. 10 is a cross-sectional view taken along the X-X line in FIG. 9. FIG. 12 is a cross-sectional view taken along the XII-XII line in FIG. 11. FIG. 14 is a cross-sectional view taken along the XIV-XIV line in FIG. 13.

First the specimen support tool 100 illustrated in FIG. 1 and FIG. 2 is prepared (S100). In the recessed portion 109 of the specimen support tool 100, the chip 110 illustrated in FIG. 3 and FIG. 4 is installed.

Then as illustrated in FIG. 5 and FIG. 6, the specimen support tool 100 is secured to the knife boat 300 by using the jig 200 (S102). The specimen support tool 100 is secured to the knife boat 300 in such a manner that the surface 107 that defines the bottom of the groove 104 becomes horizontal, for example. Thereby when the knife boat 300 is filled with distilled water, the surface 107 that defines the bottom of the groove 104 becomes parallel with the water surface.

Hydrophilic treatment may be performed on the specimen support tool 100 before securing the specimen support tool 100 to the knife boat 300. The hydrophilic treatment is performed by using plasma asher or UV ozone cleaner, for example.

Figure 9:
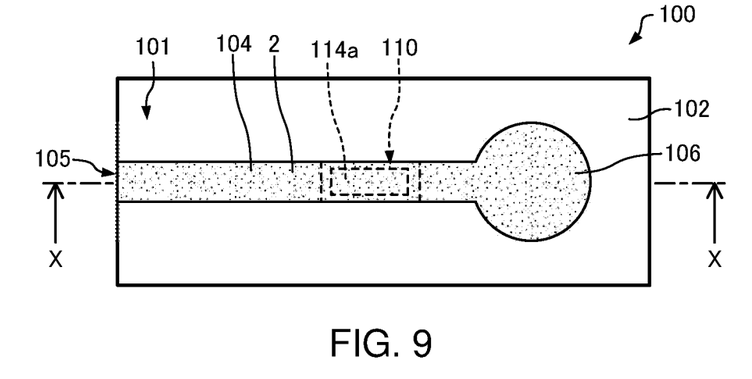
FIG. 9 is a schematic diagram illustrating a specimen preparation step using a specimen support tool according to the first embodiment.
Figure 10:
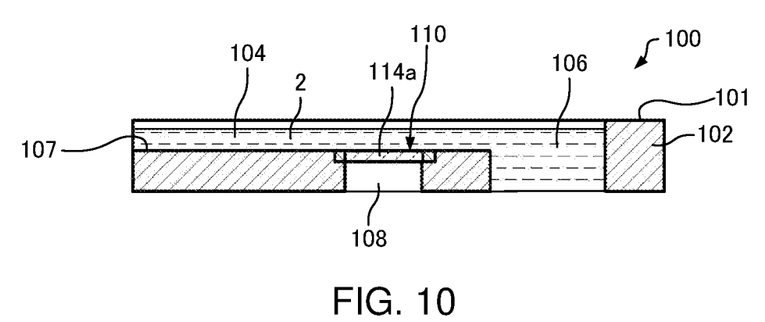
FIG. 10 is a schematic diagram illustrating a specimen preparation step using a specimen support tool according to the first embodiment.

Then as illustrated in FIG. 9 and FIG. 10, the groove 104 of the specimen support tool 100 is filled with distilled water 2 (S104). Specifically, the knife boat 300 is filled with the distilled water 2. When the knife boat 300 is filled with the distilled water 2, the groove 104 of the specimen support tool 100 is filled with the distilled water 2. The height of the water surface level is lower than the upper surface 101 of the specimen support tool 100, and higher than the surface 107 that defines the bottom of the groove 104.

Then a slice is prepared by using a microtome (S106). For example, a bulk specimen, which is fed out at a predetermined feed rate, is moved from the top to the bottom against the knife 310, so as to section the bulk specimen thin. Thereby a slice of which thickness is 100 nm or less is prepared. By repeating this sectioning, a plurality of slices are connected, and a ribbon-shaped continuous slice is formed.

Figure 11:
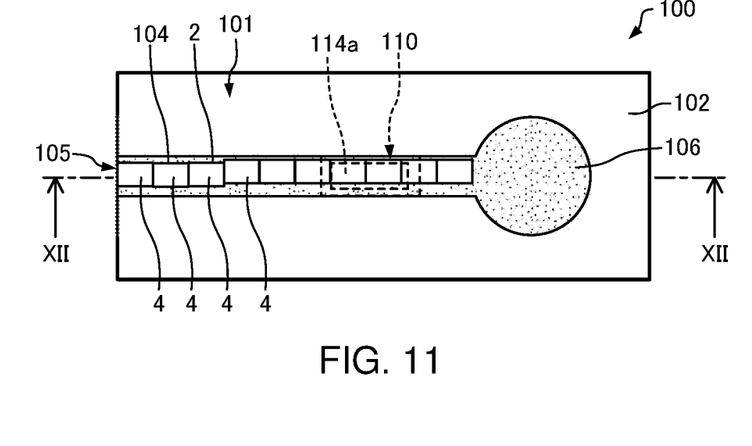
FIG. 11 is a schematic diagram illustrating a specimen preparation step using a specimen support tool according to the first embodiment.
Figure 12:
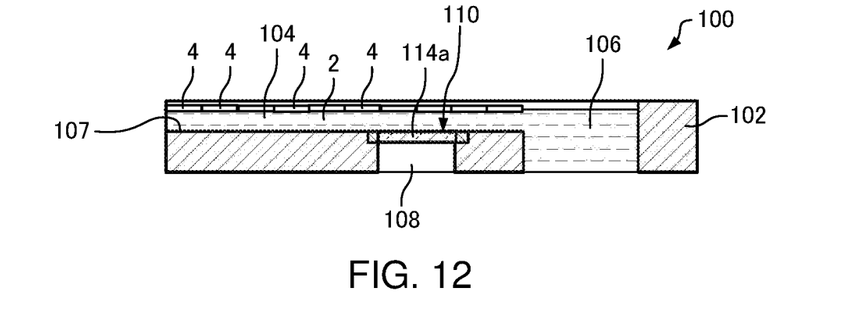
FIG. 12 is a schematic diagram illustrating a specimen preparation step using a specimen support tool according to the first embodiment.

As illustrated in FIG. 11 and FIG. 12, the prepared slices 4 become a continuous slice where a plurality of slices 4 are connected. The continuous slice is floated on a water surface of the distilled water 2. The continuous slice is spread on the water surface of the distilled water 2 filling the groove 104 of the specimen support tool 100. By repeating the sectioning, the continuous slice extends. Then the continuous slice is guided by the groove 104 of the specimen support tool 100 and led to the thin film region 114a of the chip 110. The sectioning stops when the target slice 4 is led to the thin film region 114a.

Then the distilled water 2, filling the groove 104 of the specimen support tool 100, is drained (S108).

First a pipe, which is connected to a syringe pump, is connected to the drain port 212 of the jig 200 illustrated in FIG. 7. Then the syringe pump is operated so as to drain the distilled water 2 collected in the second recessed portion 204 of the jig 200. The second recessed portion 204 communicates with the first through hole 106 of the specimen support tool 100, and the first through hole 106 communicates with the groove 104. Therefore the distilled water 2 filling the groove 104 can be drained by draining the distilled water 2 collected in the second recessed portion 204. As illustrated in FIG. 13 and FIG. 14, the slice 4 is placed on the thin film region 114a by draining the distilled water 2 filling the groove 104.

The speed of draining the distilled water 2 using the syringe pump is about 50 ml/hour, for example. By slowly draining the distilled water 2 filling the groove 104 like this, the generation of a flow or fluctuation of the water surface on the distilled water 2 can be prevented when the distilled water 2 is drained, whereby it can be prevented that the slice 4 is moved or bent.

By the above processing steps, the slice 4 can be supported by the specimen support tool 100.

The specimen support tool 100 in the state of supporting the slice 4 is detached from the jig 200, and loaded into a transmission electron microscope.

1.4. Functional Effect

The specimen support tool 100 includes the specimen support member 102 on which the groove 104 for guiding the slice 4 prepared by using the microtome is disposed. Therefore in the specimen support tool 100, the slice 4 prepared by using the microtome can be placed at a desired position, that is, on the thin film region 114a of the chip 110.

In order to observe a slice 4 by using a transmission electron microscope or a scanning transmission electron microscope, the slice 4 must be placed on a region where an electron beam can be transmitted, such as the thin film region 114a. Here the size of the specimen that can be loaded into the transmission electron microscope or the scanning transmission electron microscope is limited to several mm or less. This means that the slice 4 prepared by using the microtome must be placed on the thin film region 114a that is several mm or less.

In the specimen support tool 100, the slice 4 can be easily placed in the thin film region 114a by using the groove 104 of the specimen support member 102 as a guide, as mentioned above. Therefore by using the specimen support tool 100 to prepare a specimen (slice 4) for a transmission electron microscope or a scanning transmission microscope, the specimen (slice 4) can be easily placed in an observable region.

In the specimen support tool 100, the first through hole 106 is formed in the specimen support member 102, and the groove 104 extends from the edge 105 of the specimen support member 102 to the first through hole 106. Therefore in the specimen support tool 100, the distilled water 2 filling the groove 104 can be drained from the first through hole 106.

For example, in the case of draining the distilled water 2 filling the groove 104 by draining the distilled water 2 from the bottom of the knife boat 300, a flow may be generated in the distilled water 2 filling the groove 104, or the water surface thereof may fluctuate. In some cases, the distilled water 2 remains in the groove 104.

Whereas in the case of draining the distilled water 2 filling the groove 104 from the first through hole 106, generation of a flow and fluctuation of the water surface can be reduced. Further, distilled water 2 remaining in the groove 104 can be prevented. Therefore in the specimen support tool 100, by draining the distilled water 2 filling the groove 104 from the first through hole 106, it can be prevented that the slice 4 is moved or bent by the flow or fluctuation of the water. It can also be prevented that the slice 4 is bent or deviated from a desired position by the distilled water 2 remaining in the groove 104.

In the specimen support tool 100, a recessed portion 109 is formed on the surface 107 that defines the groove 104 of the specimen support member 102, and the chip 110, having the support film 114, can be placed in the recessed portion 109. Therefore in the specimen support tool 100, the slice 4 can be placed on the support film 114.

In the specimen support tool 100, the second through hole 108 is formed on the specimen support member 102 in a region overlapping with the support film 114. Therefore in the specimen support tool 100, when an electron beam is emitted onto the slice 4 on the support film 114, the electron beam transmitted through the slice 4 passes through the second through hole 108. Hence the specimen support tool 100 can be used as a specimen cartridge (specimen holder) for a transmission electron microscope.

The support apparatus 10 is a support apparatus for supporting a slice 4 prepared by using a microtome, and includes: the specimen support tool 100, including the specimen support member 102 on which the groove 104 for guiding the slice 4 is formed; and the jig 200 for securing the specimen support tool 100 to the knife boat 300 that contains the distilled water 2. Therefore in the support apparatus 10, a slice 4 prepared by using the microtome can be placed at a desired position.

In the support apparatus 10, the jig 200 secures the specimen support tool 100 to the knife boat 300 in such a manner that the groove 104 of the specimen support tool 100 is filled with the distilled water 2. Therefore in the support apparatus 10, the slice 4 can be guided by the groove 104.

In the support apparatus 10, the jig 200 is disposed on the surface 203 on which the specimen support tool 100 is placed, and includes the second recessed portion 204 which communicates with the first through hole 106 of the specimen support tool 100 and the flow passage 210 for draining the distilled water 2 collected in the second recessed portion 204, and drains the distilled water 2 filling the groove 104 by draining the distilled water 2 collected in the second recessed portion 204. Therefore in the support apparatus 10, it can be prevented that the slice 4 is moved or bent by the flow or fluctuation of the water.

1.5. Modification

In the above embodiment, the specimen support tool 100 is installed in the knife boat 300 by using the jig 200, as illustrated in FIG. 5 and FIG. 6, but the method of installing the specimen support tool 100 in the knife boat 300 is not limited to this.

Figure 15:
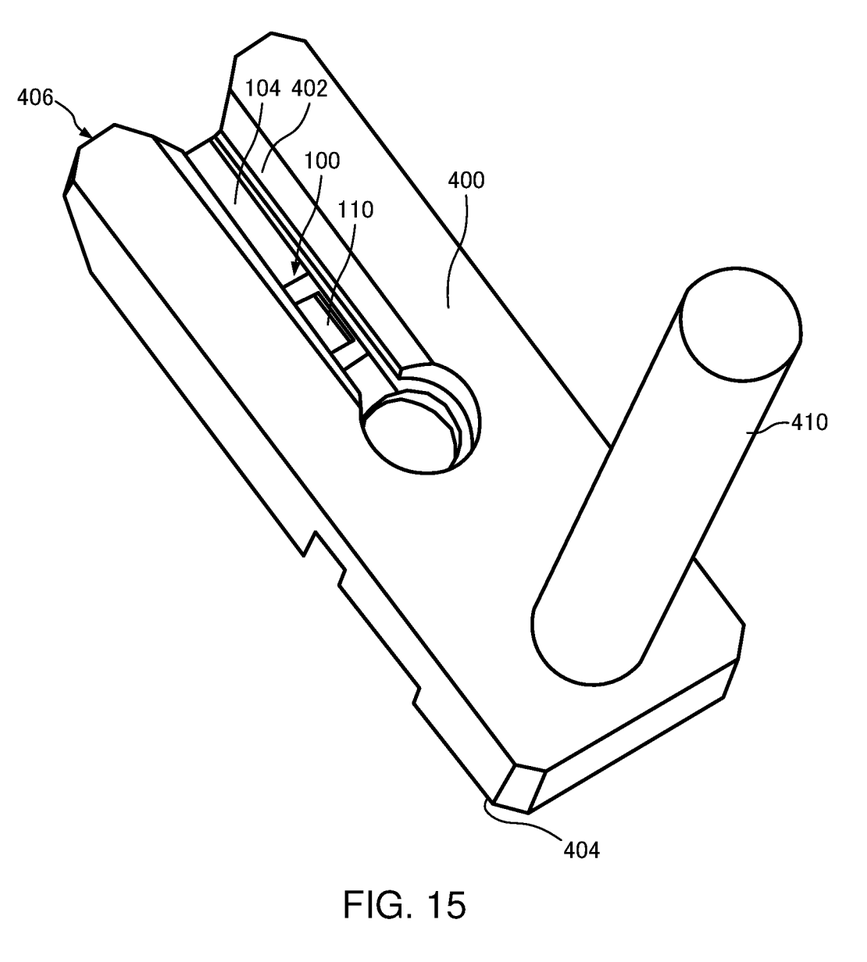
FIG. 15 is a schematic perspective view illustrating a state of installing a holder on a specimen support tool.
Figure 16:
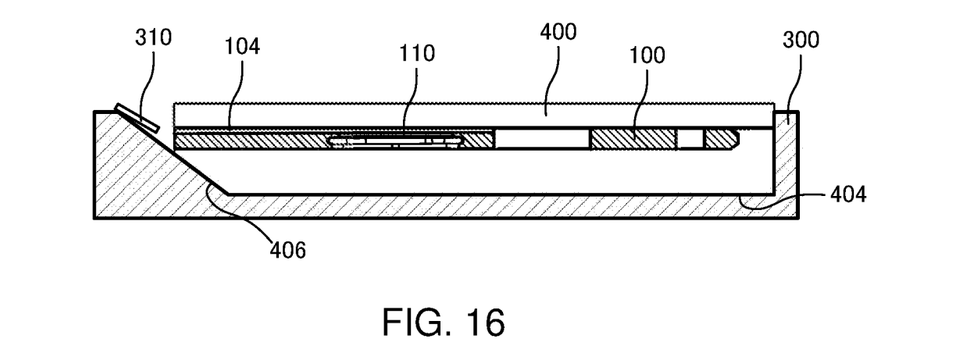
FIG. 16 is a schematic cross-sectional view illustrating a state of setting a specimen support tool, on which a holder is installed, in a knife boat.

FIG. 15 is a schematic perspective view illustrating a state where a holder 400 is installed on the specimen support tool 100. FIG. 16 is a schematic cross-sectional view illustrating a state where the specimen support tool 100, on which the holder 400 is installed, is set in the knife boat 300.

The holder 400 is installed on the specimen support tool 100. As illustrated in FIG. 15, the holder 400 includes an opening 402 at a position overlapping with the groove 104 of the specimen support tool 100. The opening 402 and the groove 104 function as a guide groove for guiding a slice. In other words, by installing the holder 400 on the specimen support tool 100, the depth of the guide groove for guiding a slice can be increased compared with the case of using the specimen support tool 100 alone.

The holder 400 includes a lower surface 404 and an inclined surface 406. As illustrated in FIG. 16, when the specimen support tool 100 is installed in the knife boat 300, the lower surface 404 of the holder 400 contacts the bottom of the knife boat 300, and the inclined surface 406 of the holder 400 contacts the inclined side surface of the knife boat 300. Hence the specimen support tool 100 can be secured to the knife boat 300 at an accurate position. For example, a surface where the knife 310 of the knife boat 300 is secured is inclined, and the specimen support tool 100 is set in the knife boat 300, so as to contact the inclined surface 406 of the holder 400 with this inclined surface.

The holder 400 holds the specimen support tool 100 in a horizontal position, as illustrated in FIG. 15. Hence the specimen support tool 100 can be supported in parallel with the water surface.

The holder 400 has a grip 410. The grip 410 is a bar-shaped member. Because the holder 400 has the grip 410, the user can set the specimen support tool 100 in the knife boat 300 without touching the specimen support tool 100.

The specimen preparation method according to this modification is the same as the specimen preparation method described above with reference to FIG. 8, hence the description thereof is omitted.

2. Second Embodiment

2.1. Specimen Support Tool

Figure 17:
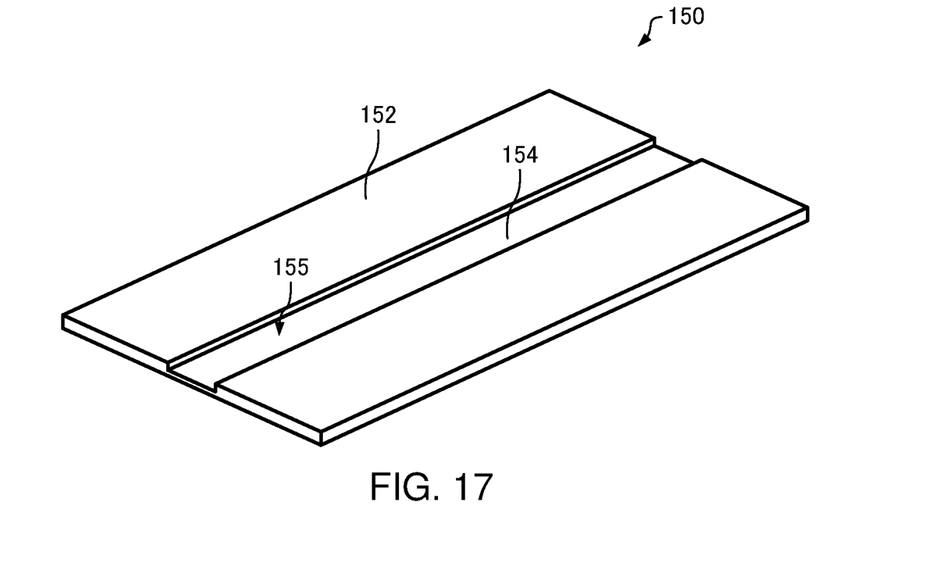
FIG. 17 is a schematic perspective view illustrating a specimen support tool according to the second embodiment.

A specimen support tool according to the second embodiment will be described next with reference to the drawings. FIG. 17 is a schematic perspective view illustrating the specimen support tool 150 according to the second embodiment. In the specimen support tool 150 according to the second embodiment, a member having a similar function as a composing member of the specimen support tool 100 according to the first embodiment is denoted with a same reference sign, and detailed description thereof is omitted.

The specimen support tool 100 illustrated in FIG. 1 and FIG. 2 is a specimen holder (cartridge) for a transmission electron microscope. The specimen support tool 150, on the other hand, is a specimen mount for an electron microscope. The specimen support tool 150 may also be used for a specimen mount for an optical microscope or fluorescence microscope.

The specimen support tool 150 includes a specimen support member 152. The specimen support member 152 is a silicon substrate, for example. For the specimen support member 152, various substrates, such as a ceramic substrate, a glass substrate, a sapphire substrate and a synthetic resin substrate, may be used.

A groove 154 is formed in the specimen support member 152. The groove 154 extends linearly from one edge to the other edge. The groove 154 functions as a guide groove for guiding a slice prepared by using a microtome.

The groove 154 can be formed by patterning the silicon substrate by using lithography, for example. The groove 154 may also be formed by forming a metal film on the silicon substrate and patterning this metal film, for example. Further, a polymer film such as SU-8 may be deposited on the groove 154 after the groove 154 is formed on the substrate, so that wettability of the groove 154 and wettability of the other portion can be different.

2.2. Specimen Preparation Method

Figure 18:
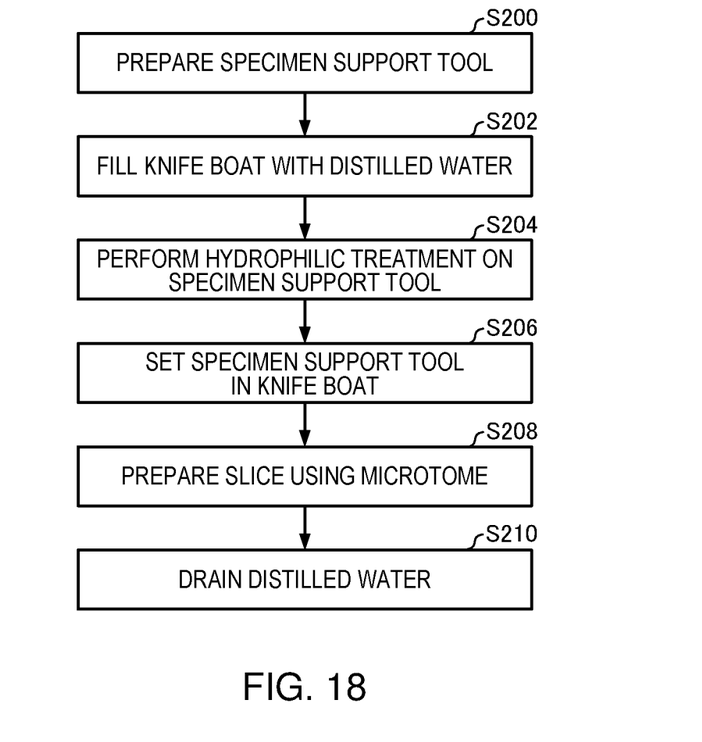
FIG. 18 is a flow chart illustrating an example of a specimen preparation method using a specimen support tool according to the second embodiment.
Figure 19:
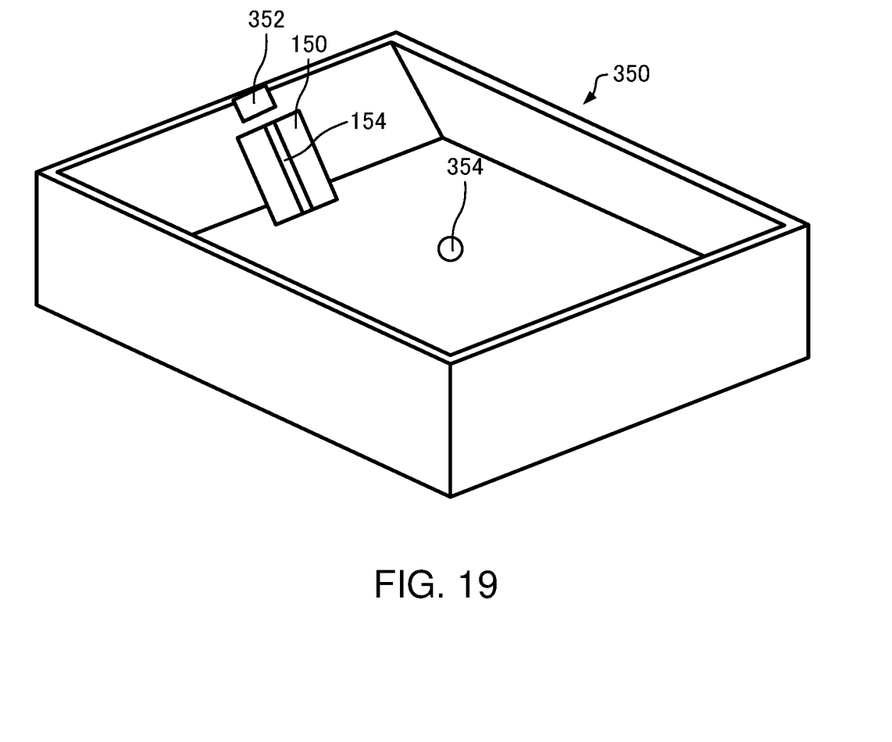
FIG. 19 is a schematic diagram illustrating a specimen preparation step using a specimen support tool according to the second embodiment.

FIG. 18 is a flow chart illustrating an example of a specimen preparation method using the specimen support tool 150. FIG. 19 is a schematic diagram illustrating the specimen preparation step using the specimen support tool 150.

First the specimen support tool 150 illustrated in FIG. 17 is prepared (S200).

Then a knife boat 350 is filled with distilled water (S202). A knife 352 is secured to the knife boat 350. A drain port 354, to drain the distilled water, is formed on the bottom of the knife boat 350.

Then hydrophilic treatment is performed on the specimen support tool 150 (S204). The hydrophilic treatment is performed by using plasma asher or UV ozone clearer, for example.

Then the specimen support tool 150 is set in the knife boat 350 (S206).

Then a slice is prepared by using a microtome (S208). The prepared continuous slice is spread on the water surface. Here the groove 154 of the specimen support tool 150 functions as a guide, and the continuous slice is linearly spread. Since the specimen support tool 150 has the groove 154, the continuous slice is linearly spread with bending.

Then the distilled water filling the knife boat 350 is drained (S210). For example, the distilled water filling the knife boat 350 is drained by using a syringe pump. The distilled water may be drained from the drain port 354 as well.

By draining the distilled water filling the knife boat 350, the water surface is lowered, and the continuous slice spread on the water surface is placed on the surface 155 that defines the bottom of the groove 154 of the specimen support tool 150.

For example, the distilled water filling the knife boat 350 may be drained while preparing the slice. In the specimen support tool 150, the groove 154 which is above the water surface functions as a guide, hence when the distilled water is drained to lower the water surface while preparing the slice, an even longer continuous slice can be linearly placed along the groove 154.

2.3. Functional Effect

The specimen support tool 150 includes the specimen support member 152 on which the groove 154 for guiding a slice prepared by using a microtome is formed. Therefore in the specimen support tool 100, the slice prepared by using the microtome can be linearly placed in the groove 154 on the specimen support member 152.

The invention is not limited to the above-described embodiments, and various modifications can be made. For example, the invention includes configurations that are substantially the same as the configurations described in the embodiments. Substantially same configurations means configurations that are the same in function, method, and results, or configurations that are the same in objective and effects, for example. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. A specimen support tool for supporting a slice prepared by using a microtome, the specimen support tool comprising a specimen support member on which a groove for guiding the slice is formed, wherein the groove has an open end for passage of the slice, and wherein
   a first through hole is formed in the specimen support member,
   the groove extends from an edge of the specimen support member to the first through hole,
   a recessed portion is formed on a surface that defines a bottom of the groove of the specimen support member, and
   a chip having a support film for supporting the slice is installable in the recessed portion.

2. The specimen support tool according to claim 1, wherein
   in the specimen support member, a second through hole is formed in a region overlapping with the support film.

3. A support apparatus for supporting a slice prepared by using a microtome, the support apparatus comprising:
   the specimen support according to claim 1; and
   a jig for securing the specimen support tool to a container for a liquid for floating the slice.

4. The support apparatus according to claim 3, wherein the jig secures the specimen support tool to the container in such a manner that the groove is filled with the liquid.

5. The support apparatus according to claim 3, wherein
   a first through hole is formed in the specimen support member, and
   the groove extends from an edge of the specimen support member to the first through hole.

6. The support apparatus according to claim 3, wherein the jig comprises:
   a recessed portion formed on a surface on which the specimen support tool is placed, the recessed portion communicating with the first through hole; and
   a flow passage for draining the liquid collected in the recessed portion, and
   the liquid filling the groove is drained by draining the liquid collected in the recessed portion.

* * * * *